United States Patent [19]

Verne

[11] 4,204,203
[45] May 20, 1980

[54] LEVEL INDICATOR

[75] Inventor: Michel Verne, Aubervilliers, France

[73] Assignee: Societe Anonyme DBA, Paris, France

[21] Appl. No.: 927,265

[22] Filed: Jul. 21, 1978

[30] Foreign Application Priority Data

Jul. 26, 1977 [FR] France .................. 77 22955

[51] Int. Cl.² ............................................. G08B 21/00
[52] U.S. Cl. .................................. 340/620; 73/304 R; 340/59; 340/614; 340/622
[58] Field of Search .............. 340/59, 618, 620, 614, 340/626, 642, 644, 584, 592, 622; 73/295, 304 R; 219/494, 496, 512, 332

[56] References Cited

U.S. PATENT DOCUMENTS

| | | | |
|---|---|---|---|
| 3,132,331 | 5/1964 | Boddy | 340/59 |
| 3,739,337 | 6/1973 | Hill | 340/59 |

Primary Examiner—John W. Caldwell, Sr.
Assistant Examiner—Daniel Myer
Attorney, Agent, or Firm—Leo H. McCormick, Jr.; Ken C. Decker

[57] ABSTRACT

A level indicator comprises a tubular probe immersed in the liquid to a depth defining the minimum liquid level in the reservoir. The probe communicates with a gas-filled chamber with a heating resistor therein. A warning member is connected to the gas-filled chamber to indicate that the level of the liquid reaches a minimum as indicated by no pressure increase occurring in said chamber.

11 Claims, 2 Drawing Figures

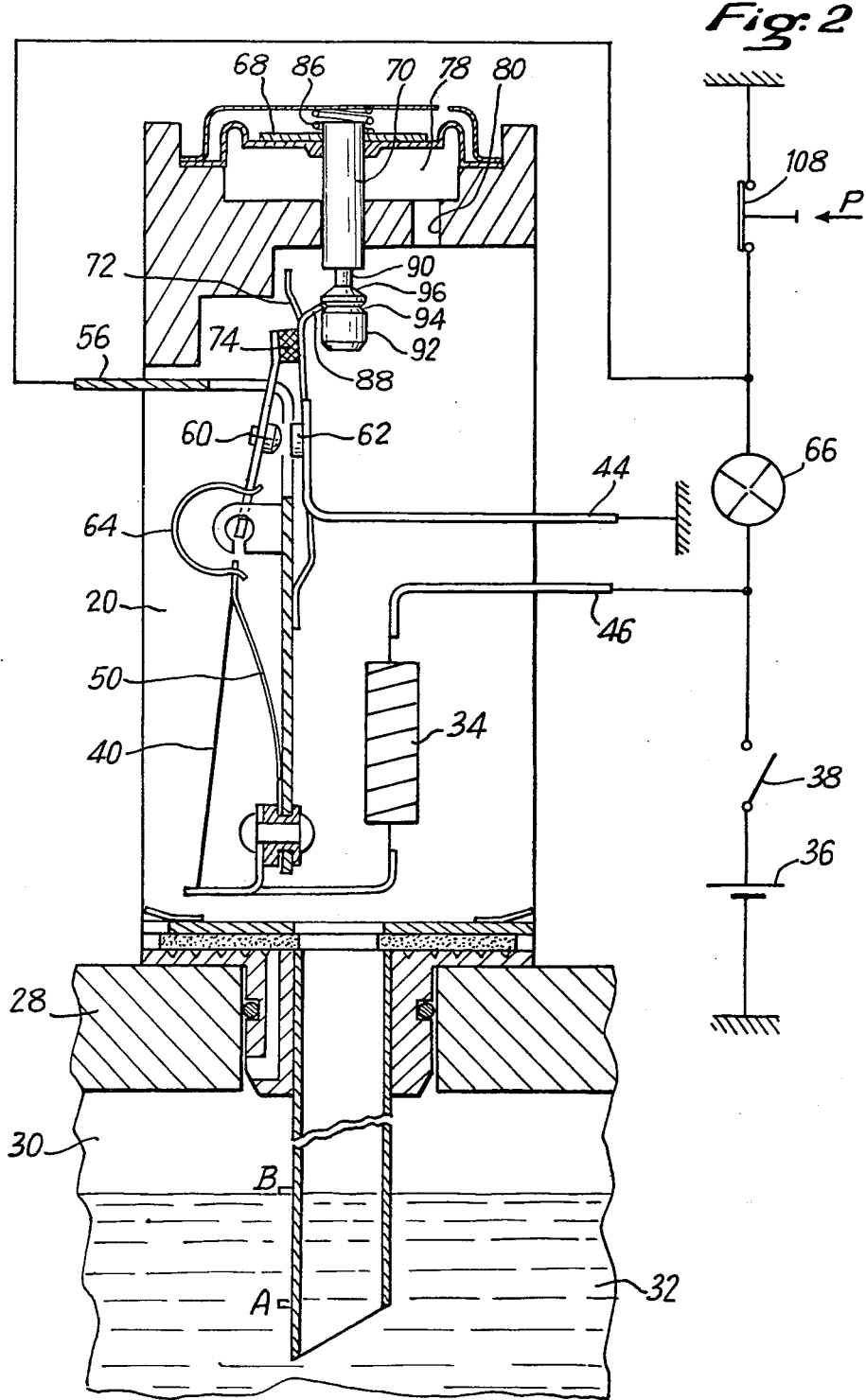

LEVEL INDICATOR

BACKGROUND OF THE INVENTION

The invention relates to a level indicator for liquid contained in a reservoir, the latter being, for example, the crank case of a motor vehicle.

Existing level indicators can be classified into two categories: the first category contains level indicators which give a continuous indication of the quantity of liquid present in the reservoir, and the second category give only a "binary" indication, showing whether the liquid in the reservoir is above or below a predetermined level. This invention relates to this second type of indicator, and its prime object is to operate a warning system if the reservoir's liquid level falls below a predetermined minimum.

SUMMARY OF THE INVENTION

The invention proposes a level indicator for a liquid contained in a reservoir, allowing the detection of whether the liquid level is above or below a predetermined minimum by means which are particularly simple, reliable and effective.

The level indicator has a probe for immersion in the liquid to a depth defining the minimum liquid level in the reservoir, a gas pressure source comprising a housing defining a gas-filled chamber communicating with the probe, a locking device capable of responding to the pressure variations inside the chamber so as to occupy at least two distinct positions, and a warning system responsive to the position occupied by the locking device. A pressure increase in the chamber due to operation of the gas pressure source urges the locking device into a locking position when the liquid level in the reservoir is above the minimum level, while operation of the gas pressure source when the liquid level is lower than or equal to the minimum level results in an escape of gas through the probe, so that the locking device remains in an idle position for which the warning system is operated.

According to another feature of the invention, the warning system comprises a bistable device and an indicator device, operation of which is effected alternately by the bistable device when the locking device is in its idle position, following on operation of the gas pressure source.

In this case, of course, the signal received at the indicator device is an alternating signal which can be distinguished, for example, from a continuous signal detectable selectively by the same indicator device, should the latter be used to display information other than the presence of insufficient liquid in the reservoir.

A particular embodiment of the invention will now be described by way of example only with reference to the accompanying drawings, in which:

BRIEF DESCRIPTION OF THE DRAWINGS

FIG. 2 illustrates the level indicator from FIG. 1 when the liquid in the crank case is substantially above the minimum acceptable level.

DETAILED DESCRIPTION OF THE INVENTION

Figure 1:
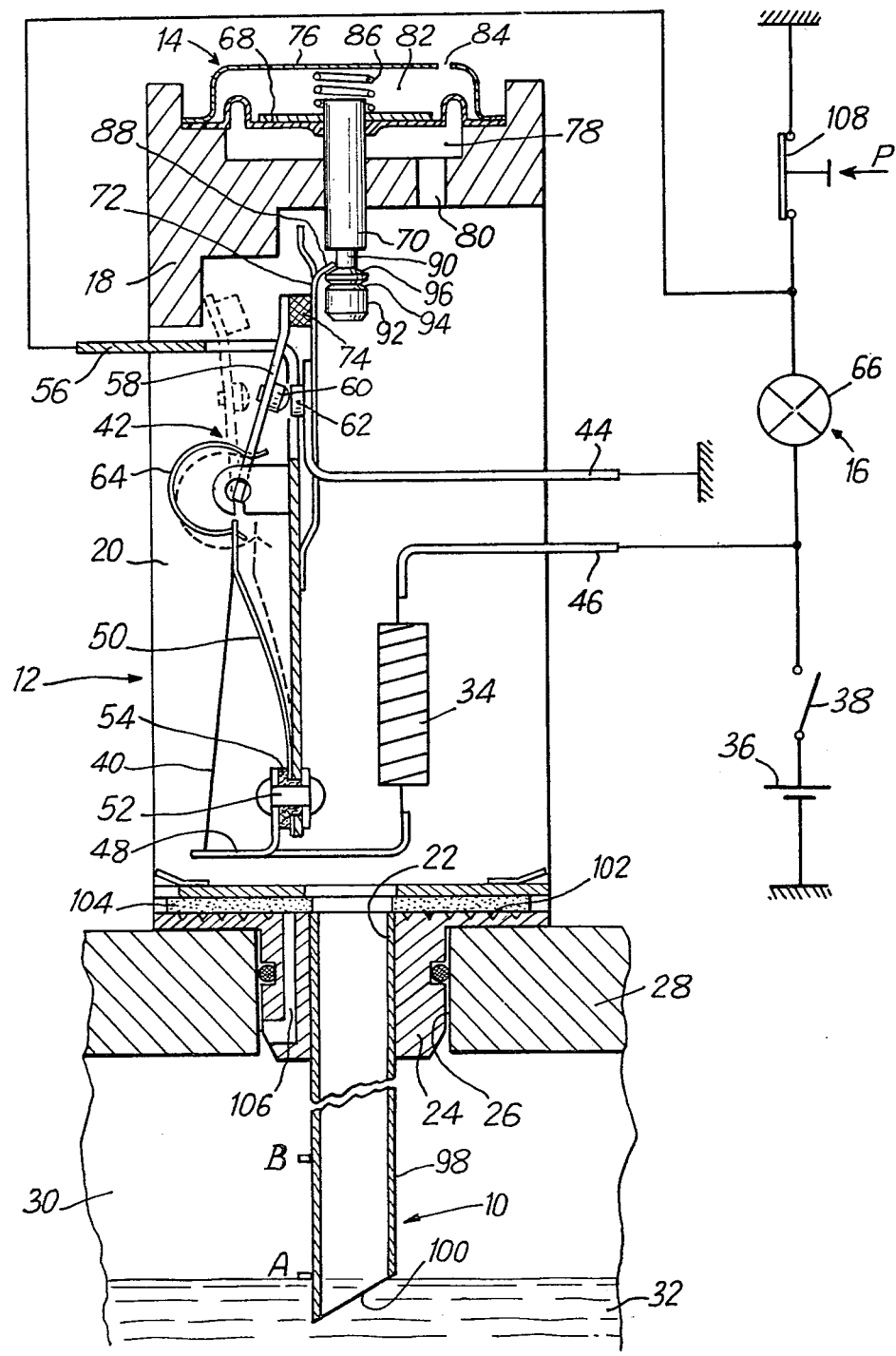
FIG. 1 illustrates diagrammatically a level indicator for the liquid contained in the crank case of a motor vehicle, made according to the principles of the invention wherein the liquid is slightly below a minimum acceptable level.

The level indicator illustrated in FIGS. 1 and 2 comprises a probe generally designated 10, a gas pressure source generally designated 12, a locking device generally designated 14 and a warning device generally designated 16.

The gas pressure source 12 comprises a housing 18 containing a gas-filled chamber 20 which communicates with the probe 10 through a measuring orifice 22 formed in a tubular connector 24. The tubular connector 24 is located in a fluid-tight manner in aperture 26, which has a cylindrical cross-section, formed in the roof 28 of the reservoir 30 (shown only in part in the Figures). The reservoir 30 is the crank case of a motor vehicle, and the liquid whose level is to be monitored is the lubricant 32 contained in the crank case.

The pressure source 12 comprises a heating resistance 34 situated inside the chamber 20. The heater resistance 34 is supplied with energy by an electrical circuit. The electrical circuit includes a direct-current voltage source 36, (for example, the accumulator battery of the vehicle) and a switch 38, preferably the ignition switch of the vehicle. The electrical circuit includes a heating wire 40 and a bistable device 42, both situated inside the chamber 20. The heating wire 40 and bistable device 42 are connected to an input terminal 44 connected to the vehicle chassis and to the heating resistance 34 which is connected itself to the switch 38 by an input terminal 46.

One end of the heating wire 40 is fixed to a terminal 48 which is situated inside the housing 18 and connected to the heating resistance 34. The other end of the wire 40 is tensioned by a leaf spring 50 of which the opposite end is attached to the housing 18 by a rivet 52 which also attaches the terminal 48. The rivet 52 is electrically insulated from the leaf spring 50 by an insulating element 54. The rivet 52 also attaches a second output terminal 56 on which an arm 58 is pivoted to the housing 18. This arm 58 bears a movable contact 60 capable of engaging a fixed contact 62 mounted on the output terminal 44. Pivoting of the arm 58 is controlled by a leaf spring 64 which is responsive to the motion of the free end of the leaf spring 50. Motion of the free end is controlled by the changes in length of the heating wire 40.

The bistable device 42 which consists of the movable contact 60 and fixed contact 62 and is entirely housed in the chamber 20. Note that the movable contact 60 is electrically connected to the output terminal 56 at all times.

The warning system 16 consists of the bistable device 42 and an indicator device 66. The indicator device 66 is shown as a warning light however any analogous device which can be mounted on the instrument panel of the vehicle would be acceptable. The indicator device 66 is connected between the input and output terminals 46, 56 so that it is operated when the movable contact 60 engages the fixed contact 62 and the ignition switch 38 being closed.

The locking device 14 includes a piston forming means comprising a diaphragm 68 and a push rod 70 which control the movements of a movable abutment 72. A ferrite block 74 on the end of the arm 58 is connected to the movable contact 60, the role of which will become apparent in the course of this description. The outer peripheral edges of the diaphragm 68 are gripped between a cover 76 and that wall of the housing 18 remote from the connector 24. The diaphragm 68 defines a working chamber 78 between the housing 18 and the cover 76. The working chamber 78 communicates the chamber 20 through a passage 80, and to a second chamber 82 which communicates with the atmosphere through a aperture 84. A spring 86 is located in the second chamber 82 for normally biasing the diaphragm 68 downwards in the Figures. The push rod 70 is attached to the diaphragm 68 and traverses the wall of the housing 18 to engage a lug 88 on the free end of a second leaf spring. The second leaf spring has a movable abutment 72 on one end while the other end is fixed by any appropriate means (for example, welding) to the output terminal 56. That end of the push rod 70 situated inside the chamber 20 which cooperates with the lug 88 has a small diameter section 90 and large diameter section 92. The push rod 72 has a frusto-conical section that extends from the small diameter section 90 to the large diameter 92. A groove 94 is located in the large diameter 92 adjacent the frusto-conical portion 96. The lug 88 moves from the small diameter section 90 to the groove 94 in large diameter portion 92 by way of the frusto-conical section 96 when the push rod 70 is urged upwards in the Figures. When the end of the lug 88 engages in the groove 94, the resilience of the leaf spring 72 normally prevents it from escaping, and the push rod 70 is then locked in its upper position as shown in FIG. 2.

A venting duct controls a pressure drop between the chamber 20 and the atmosphere to prevent the air enclosed in the probe 10, from rising far or irreversibly when the engine cools, which might falsify the next reading by suggesting that the liquid level 32 inside the crank case 30 is substantially higher than the actual level. The probe 10 has a tube 98 with a bevelled end 100 immersed in the liquid and a free end connected to chamber 20. The venting duct is a groove in the form of a spiral 102 formed in the connector 24 opposite a sealing washer 104 inserted between the connector and the remainder of the housing 18. The spiral groove 102 is connected to a passage 106 in connector 24 for providing a relief port for the crank case 30.

Lastly, note that the oil pressure switch 108 of the vehicle is also connected in series with the indicator device 66 and ignition switch 38 to define a third electrical circuit, enabling the indicator device 66 to show whether the oil pressure in the vehicle's crank case is correct before operation of the latter and after the ignition has been switched on.

MODE OF OPERATION OF THE INVENTION

When the vehicle is stationary and the ignition is off, the various components of the level indicator occupy the positions illustrated in FIG. 1 wherein the level of liquid 32 contained in the reservoir 30 is slightly below the minimum admissible level A. The maximum level B is given also for information. When the driver of the vehicle switches on the ignition switch 38 the oil pressure switch 108 is normally in the closed position, so that the indicator device 66 is operated continuously. Simultaneously, the electrical circuit containing the resistance 34 and heating wire 40 closes, so that the gas contained in the chamber 20 (atmospheric air in the embodiment described) heats and its pressure tends to rise. The heating wire 40 expands in parallel, so that the leaf springs 50, 64 and the arm 58 take up the positions shown by broken lines in FIG. 1.

Since the level of liquid 32 in the reservoir 30 is below the minimum level A, there is a direct connection through the tube 98 from the chamber 20 to the chamber defined above the liquid 32 in the reservoir 30. As a result, the heating of the air in the chamber 20 by the resistance 34, which would normally result in a pressure rise in the chamber 20, is substantially eliminated since the heated air escapes from the chamber 20 through tube 98 into reservoir 30. The pressure inside the chamber 20 therefore remains substantially constant and certainly does not rise sufficiently to urge the push rod 70 upwards in FIG. 1 by way of the diaphragm 68. Thus the arm 88 of the leaf spring 72 continues to bear on the small-diameter section 90 of the push rod 70.

When the extension of the heating wire 40 has caused the bistable device 42 to move into the position shown by broken lines in FIG. 1, the movable contact 60 no longer touches the fixed contact 62. However, the circuit including the heating resistance 34 and heating wire 40 is still connected to the terminal 56, so that the heating resistance 34 and heating wire 40 remain energized until the engine of the vehicle is started. The heating wire 40 therefore remains extended, so that the movable contact 60 can be held in a "waiting" position.

When the vehicle engine is started, the oil pressure switch 108 opens. An immediate result is the disconnection of the indicator device 66 from the source of electrical current. Also, however, the heating wire 40 and heating resistance 34 are switched off, so that, above all, the wire 40 becomes shorter as it cools. This rapidly brings the movable contact 60 into engagement with the fixed contact 62, with no interference from the leaf spring 72 since the locking device 14 is still in its idle position. As a result the warning device 66 operates and the circuit containing the heating resistance 34 and heating wire 40 closes again. Closing of the latter circuit causes the heating wire 40 to extend again, so that the movable contact 60 is moved away from the fixed contact 62 again under the influence of the leaf springs 50, 64. The warning device 66 is therefore disconnected again, and the heating wire 40 retracts again until the movable contact 60 engages the fixed contact 62 to cause renewed operation of the warning device 66 and further extension of the heating wire 40. The warning device 66 is thus operated alternately until the vehicle's switch is turned off, that is, in effect, until the vehicle stops. The information thus given on the vehicle's instrument panel as regards the inadequacy of the liquid level in the crank case appears after the engine has started and can be distinguished from information relating to inadequate oil pressure, given before the engine is started. The two types of information are communicated to the vehicle driver by the same indicator device 66 and can be distinguished from one another clearly because of the continuous nature of operation of this device when the information relates to the oil pressure and the alternating nature of operation of the device when the information relates to the oil level.

When the level of liquid 32 in the reservoir 30 is substantially above the minimum level A tolerated, for example equal to the maximum level B as shown in FIG. 2, the level indicator operates as follows. When the ignition switch 38 is turned on, extension of the wire 40 results in movement of the leaf springs 50, 64 and arm 58 into the positions shown by broken lines in FIG. 1. However, heating of the air inside the chamber 20 due to the energization of the resistance 34 results in a pressure rise inside this chamber, since the air cannot immediately escape through the end of the tube 98, but expels the liquid from the tube. The pressure rises inside the chamber 20 to a degree corresponding to how far the tube 98 is immersed in the liquid 32. As a result the pressure in the chamber 20 and communicated through the orifice 80 to the operating chamber 78 becomes high enough to urge the diaphragm 68 upwards as shown in FIG. 2, counteracting the spring 86. As the diaphragm 68 moves the arm 88 of the leaf spring 72 enters the groove 94 in the large-diameter portion 92 of the push rod 70. The force exerted is then sufficient to maintain the push rod 70 in the position illustrated at FIG. 2, against spring 86, whatever the pressure prevailing in the working chamber 78 is.

When the pressure switch 108 is opened, as a result of the starting of the engine, the electrical circuit containing the heating resistance 34 and heating wire 40 is no longer supplied with electrical current and as a result the heating wire 40 tends to shorten again, so tending to return the arm 58 to the position shown by solid lines in FIG. 1. However, because of engagement of the arm 88 into the groove 94, the leaf spring 72 then constitutes an abutment against which the end of the arm 58 comes in abutment, under the action of the ferrite block 74. The movable contact 60 cannot then engage the fixed contact 62, so that the to-and-fro action of the arm 58 described with reference to FIG. 1 cannot take place and the disconnection of the indicator device 66 due to opening of the pressure switch 108 does not arise again.

The device just described thus makes it possible both to give an indication of the oil pressure inside the vehicle's engine upon starting, by continuous extinction of the indicator device 66, and to indicate any shortage of liquid in the reservoir 30 once the engine has started, by alternate operation of the indicator device 66, this alternate operation is known and easy to distinguish from its continuous operation for pressure verification purposes.

Note, lastly, that when the level of liquid 32 in the crank case 30 is adequate when the vehicle starts, the locking device 14 remains in the position shown in FIG. 2 until the vehicle stops and until the ignition switch 38 is next turned on. As before, turning this switch completes the circuit containing the heating resistance 34 and heating wire 40, so that the arm 58 is urged into the position shown by broken lines in FIG. 1. The ferrite block 74 can then disengage the end of the arm 88 from the groove 94 in the push rod 70, so that the latter can resume the position shown in FIG. 1 under the influence of the spring 86 and another indication, resulting for example from the liquid 32 dropping below the minimum level A, can lead to the process illustrated in FIG. 1. Alternatively, if the liquid level has remained high enough, the process described with reference to FIG. 2 is repeated.

It will be appreciated that the invention is not restricted to the embodiment described by way of example, either in respect of its application to the indication of the lubricant level in the crank case of a motor vehicle or in respect of its design, which may be modified substantially, it being possible for example to site a pressure source of the same type as the pressure source 12 relatively far away form the reservoir in which the level is to be measured.

I claim:

1. A level indicator for a liquid contained in a reservoir, comprising a tubular probe immersed in the liquid and opening to a depth which defines the minimum permissible level of said liquid in the reservoir, a gas pressure source including a housing which defines a gas-filled chamber communicating with said probe and means for increasing the pressure inside said chamber when said gas pressure source is activated, a locking device responsive to the variations of the pressure reigning inside said chamber and moving from a first position to a second position when said pressure rises above a predetermined value due to the liquid level in the reservoir being above said minimum permissible level and thus closing said tubular probe, and a warning device responsive to the position occupied by said locking device after said gas pressure source is activated, said warning device being brought into operation when the locking device then remains in its first position and out of operation as the locking device then reaches its second position.

2. A level indicator as claimed in claim 1, wherein said warning device comprises a bistable device and an indicating device, the operation of which is controlled intermittently by said bistable device when the locking device remains in its first position after the gas pressure source is activated.

3. A level indicator as claimed in claim 2, wherein both activation of the gas pressure source and operation of said bistable device are effected simultaneously through a common control member.

4. A level indicator as claimed in claim 3, wherein the gas pressure source comprises a heating resistance whereas the bistable device is operated by the changes in length of a heating wire, said bistable device, heating wire and heating resistance being all connected in series in a first current path the closure of which is effected by a first switch constituting the said control member.

5. A level indicator as claimed in claim 4, wherein the bistable device comprises a movable contact capable of engaging a fixed contact when the locking device is in its first position, abutment means being provided to prevent said movable contact from engaging said fixed contact when the locking device is in its second position.

6. A level indicator as claimed in claim 5, wherein the locking device comprises a deformable member responsive to the pressure prevailing in an operating chamber which communicates with the gas-filled chamber and a push rod attached to said deformable member, said push rod being engaged by a leaf spring which constituted the said abutment means.

7. A level indicator as claimed in claim 6, wherein said push rod is substantially cylindrical and has at least two sections of different diameter, namely a small diameter section and a large diameter section, either of which said leaf spring engages according to the position occupied by the push rod for defining said first and second positions of the locking device respectively.

8. A level indicator as claimed in claim 7, wherein a groove is provided in the large diameter section of said push rod and the leaf spring is provided with a lug which snaps into said groove as the locking device reaches its second position and which then locks the push rod in the corresponding position while counteracting the action of resilient return means associated thereto.

9. A level indicator as claimed in claim 8, wherein are provided means for unlocking said push rod, said unlocking means comprising a magnetic member associated with the movable contact of the locking device and capable of urging said leaf spring away from said push rod upon next coming intermittent movement of said movable contact.

10. A level indicator as claimed in claim 4, wherein said bistable device and said indicating device are connected in series in a second current path also controlled by said first switch.

11. A level indicator as claimed in claim 10, wherein said reservoir is constituted by the crankcase of a motor vehicle and said first switch by the ignition switch, an oil pressure switch being further connected in series with said ignition switch, heating resistance and heating wire so as to define as third current path, said oil pressure switch and said ignition switch being further connected in series with the indicating device so as to define a fourth current path.

* * * * *